United States Patent
Schöning et al.

(10) Patent No.: US 8,186,504 B2
(45) Date of Patent: May 29, 2012

(54) CURVED BELT CONVEYOR

(75) Inventors: Uwe B. Schöning, Hildesheim (DE); Bernd Grutza, Hannover (DE)

(73) Assignee: Caljan Rite-Hite APS, Hasselager (DK)

( * ) Notice: Subject to any disclaimer, the term of this patent is extended or adjusted under 35 U.S.C. 154(b) by 0 days.

(21) Appl. No.: 12/407,498

(22) Filed: Mar. 19, 2009

(65) Prior Publication Data

US 2010/0122894 A1   May 20, 2010

Related U.S. Application Data

(63) Continuation of application No. 11/485,627, filed on Jul. 13, 2006, now abandoned.

(30) Foreign Application Priority Data

Dec. 22, 2006 (DE) .......................... 10 2006 024 536

(51) Int. Cl.
    *B65G 39/02* (2006.01)
(52) U.S. Cl. ........................................ 198/842; 198/831
(58) Field of Classification Search .................. 198/831, 198/842
    See application file for complete search history.

(56) References Cited

U.S. PATENT DOCUMENTS

| | | | |
|---|---|---|---|
| 3,260,355 A | 7/1966 | Mayrath et al. | |
| 3,620,355 A | 11/1971 | Jones, Jr. | |
| 5,360,102 A * | 11/1994 | Schoning | 198/831 |
| 5,394,977 A | 3/1995 | Cline | |
| 5,839,570 A | 11/1998 | Vertogen et al. | |
| 5,944,171 A | 8/1999 | Vertogen et al. | |
| 6,564,931 B1 | 5/2003 | Edelmann | |
| 6,866,141 B2 * | 3/2005 | Saeki | 198/844.2 |
| 6,962,252 B2 | 11/2005 | Fujiwara et al. | |
| 7,232,030 B2 | 6/2007 | Duncan et al. | |
| 7,249,673 B2 * | 7/2007 | Axmann | 198/831 |
| 2004/0035685 A1 | 2/2004 | Fujiwara et al. | |
| 2006/0108207 A1 | 5/2006 | Duncan et al. | |

FOREIGN PATENT DOCUMENTS

| | | |
|---|---|---|
| DE | 29502064 | 6/1995 |
| DE | 19535757 | 3/1997 |
| DE | 19547893 | 6/1997 |
| DE | 69515605 | 8/2000 |
| DE | 69719923 | 8/2003 |

(Continued)

OTHER PUBLICATIONS

The International Bureau of the WIPO, "International Preliminary Report on Patentability," issued in connection with international application No. PCT/EP2007/004577, issued Nov. 27, 2008, 6 pages.

(Continued)

*Primary Examiner* — Joseph A Dillon, Jr.
(74) *Attorney, Agent, or Firm* — Hanley, Flight & Zimmerman, LLC

(57) ABSTRACT

Roller-guided conveyors are described herein. An example roller-guided conveyor comprises a first holder and a second holder and a first guide roller and a second guide roller. The first guide roller has a first axis of rotation and pivotally coupled to the first holder about a pivot axis that is eccentric relative to the first axis of rotation. The first guide roller is spaced a distance from the second guide roller to guide a conveyor belt therebetween.

12 Claims, 4 Drawing Sheets

FOREIGN PATENT DOCUMENTS

| JP | 2001122413 | 5/2001 |
|----|------------|--------|
| JP | 2005008376 | 1/2005 |
| WO | 2006075969 | 7/2006 |

OTHER PUBLICATIONS

The International Bureau of the WIPO, "International Preliminary Report on Patentability," issued in connection with international application No. PCT/EP2007/004577, issued Jan. 20, 2009, 6 pages.

International Searching Authority, "English Language Translation of the Written Opinion of the International Searching Authority," issued in connection with international application No. PCT/EP2007/004577, issued Nov. 23, 2008, 5 pages.

International Searching Authority, "Written Opinion of the International Searching Authority," issued in connection with international application No. PCT/EP2007/004577, issued Nov. 23, 2008, 5 pages.

English Language Translation of the Opposition filed by Transnorm System GmbH in counterpart German Patent Application DE 10 2006 024 536.9 on Dec. 4, 2008, 7 pages.

Opposition filed by Transnorm System GmbH in counterpart German Patent Application DE 10 2006 024 536.9 on Dec. 4, 2008, 10 pages.

Photographs showing a Curved Conveyor Belt Manufactured by Transnorm System GmbH displayed at the property fair in Chicago between Jan. 10, 2005 and Jan. 13, 2005. Photographs were provide in the opposition filed by Transnorm System GmbH in the counterpart German patent application DE 10 2006 024 536.9.

European Patent Office, "Office Action," issued in connection with European application serial No. 07 725 477.9, issued Nov. 11, 2009, 3 pages.

German Patent and Trademark Office, "Office Communication," informing that an appeal was filed against the decision of Grant issued by the German Patent and Trademark Office, in connection with German Patent Application DE 2006 024 536.9, issued Apr. 27, 2010, 1 page.

German Patent and Trademark Office, "Office Communication," informing the decision to reject the opposition filed, in connection with German Patent Application DE 2006 024 536.9, issued Feb. 12, 2010, 12 pages.

German Patent and Trademark Office, "Office Communication," informing the decision to reject the opposition filed, in connection with German Patent Application DE 2006 024 536.9, issued Oct. 22, 2009, 2 pages.

United States Patent and Trademark Office, "Advisory Action," issued in connection with U.S. Appl. No. 11/485,627, mailed Sep. 17, 2008, 3 pages.

United States Patent and Trademark Office, "Final Office Action," issued in connection with U.S. Appl. No. 11/485,627, mailed Feb. 19, 2008, 14 pages.

United States Patent and Trademark Office, "Non-Final Office Action," issued in connection with U.S. Appl. No. 11/485,627, mailed May 15, 2007, 11 pages.

Federal Patent Court, "Office Communication reflecting Transnorm's decision to withdraw their appeal against the decision of the German Patent Office rejecting their opposition," issued in connection with German Patent Application DE 10 2006 024 536.9, issued Oct. 5, 2011, 2 pages.

European Patent Office, "Decision to Grant," issued in connection with European application serial No. 07 725 477.9, issued Aug. 4, 2011, 1 page.

Intellectual Property Corporation of Malaysia, "Substantive Examination Adverse Report," issued in connection with Malaysian application serial No. PI20084726, issued Jan. 13, 2012, 3 pages.

* cited by examiner

CURVED BELT CONVEYOR

CROSS-REFERENCE TO RELATED APPLICATIONS

This patent is a continuation of U.S. patent application Ser. No. 11/485,627, filed Jul. 13, 2006, entitled "Curved Belt Conveyor," which claims priority to German Patent Application Serial No. 10 2006 024 536.9, filed May 23, 2006, both of which are hereby incorporated by reference in their entireties.

FIELD OF THE DISCLOSURE

This disclosure generally relates to conveyors and, more particularly, to curved belt conveyors.

BACKGROUND

A multitude of the most varied curved belt conveyors is known in the prior art for conveying, in particular, packaged goods on a belt-like conveyor.

DE 295 02 064.4 discloses a curved belt conveyor of a conveyor installation including a continuous conveyor belt that is redirected via carrier rollers and having an edge bar at the outer edge which is guided between stationary rollers that are disposed in pairs along the curve. The rollers are arranged on individual holders which are fastened in a belt-running frame and whereby respectively one roller of a roller pair is configured in such a way that it can be pivoted away from the edge bar. It is disadvantageous with this configuration that for major repair work—irrespective of whether or not a replacement of the conveyor belt may be necessary—a multitude of component parts must be disassembled which is very time consuming and therefore expensive.

One encounters the same disadvantage in the embodiment that is disclosed in DE 195 47 893 A1. It describes a curved belt conveyor with a continuous conveyor belt that is driven by a motor and guided via reverse rollers and having a beaded edge that extends along the edge which forms the outside radius of the curve and protrudes over the belt plane and for which 15 compensation of the longitudinal and transversal forces, that are generated due to the curvature, is effected by way of support rollers that are arranged with the ability to freely rotate and that are arranged at a distance relative of each other on the lateral frame side of the belt curve allocated to the outside radius in conveying direction and that are fixedly connected to the conveyor belt on the side facing the inside radius of the curve where they engage in the peripheral beaded edge. And the support rollers can be activated from their support positions from where they engage in the beaded edge of the conveyor belt thereby releasing the conveyor belt, and whereby the inside lateral frame side allocated to the inside radius of the curve is detachable from a support frame that receives the belt curve, and having an extension in terms of length and width in such a way that the conveyor belt can be pulled off without disassembly via the inside lateral frame side and from the reverse rollers in the direction of the curve center. Assembly occurs in the opposite direction.

SUMMARY

It is therefore the object of the present invention to avoid at least some of the disadvantages outlined in the above. In particular, the object of the present invention consists of providing a curved conveyor belt that allows, on the one hand, for quick belt changes and that makes it possible, on the other hand, to conduct major repairs while removing only the fewest number of component parts, thereby allowing for quick repair work.

The curved conveyor belt according to the invention includes a conveying belt that is guided by rollers and has an engagement element in the region of the edge that defines the outside radius of the curve, for example, and in particular by way of a rubber bead, against which at least one guide roller, that is fastened to the roller holder, can engage, guiding the conveyor belt. For example, and in particular, several guide rollers, driving from their diagonal position against the bead, engage relative to the outside radius of the curve pulling the belt to the outside, ensuring thereby that the conveying belt is guided correspondingly within the curve. In this context, the guide roller and/or roller holder is configured as movable away from the conveyor belt and as movable toward the conveyor belt, for example and in particular, with the ability to move and/or pivot; moreover, the roller holder is designed in one piece.

To be understood as a one-piece-design of the roller holder according to the invention are also embodiments featuring roller holders that are not designed in one piece in the classical sense but that can also include several parts which, however, are connected to each other in such a way that they are captive, thereby creating a quasi one-piece design.

This design allows for a flexible adjustment to different belt thicknesses and strengths of the guide bead while quick belt changes are possible at the same time. The part variety was reduced which is advantageous when doing a belt change or major repair work and which results, accompanied by the impossibility of losing parts of the roller holder(s), in considerable time and cost savings.

The conveyor belt itself consists, for example and in particular, of a textile mesh of one or several layers provided with a coating of rubber or another elastomeric material such as, for example, PVC (polyvinyl chloride) or PU (polyurethane). The guide rollers themselves are usually comprised of protected precision ball bearings.

The roller holders are usually made of aluminum or corresponding aluminum alloys and/or of profiled steel sheet pressings.

The roller holders can have tabs that are arranged on one side for receiving the mount or tabs that are arranged as offset, whereby with the latter the top and bottom sides are then arranged opposite each other. An advantageous alternating, i.e. reciprocal, arrangement of the tight-side and slack-side guide rollers with regard to a conveying section, with an at least almost vertical axis especially relative to the plane of movement, additionally improves the accessibility during service and repair work.

In practice it has proven effective for the guide roller to be pivotable and/or movable, for example and in particular over joints and/or elongated holes which may, for example and in particular, also be curved whereby fast and easy ability of movement away from the conveyor belt and toward the conveyor belt is made possible. In this regard it is conceivable, even though not absolutely necessary, that in connection with the ability of movement away from the conveyor belt and toward the conveyor belt, provided the conveyor belt is aligned parallel relative to the ground and thereby aligned horizontally, the guide roller has a movement vector in a perpendicular direction during its movement at least in the movement vector diagram, thus moving the guide roller upward and/or downward. Correspondingly, this also applies for the roller holder and/or for a part of the roller holder, and whereby in case of the movability of the guide roller and the roller holder and/or a part of the roller holder a high level of flexibility relative to different curved belts is encountered, and for the most varied guide rollers and applications it is possible to effect fast and cost-effective changing of the conveyor belt and/or of the corresponding settings to match the given circumstances by way of the corresponding adjustment of conveyor belt and roller holder.

Moreover, it is advantageous if the guide roller has ball bearings because this ensures a quiet operation of the guide roller.

For an even more secure guide action of the conveyor belt in the curve of the curved conveyor belt, the guide roller is paired with another guide roller that is arranged on the opposite side of the conveyor belt, thus forming a guide roller pair, which means the roller pair engages in the conveyor belt both from the top as well as from the bottom via the engagement element, in particular the rubber bead.

Furthermore, it is advantageous if at least one guide roller is arranged eccentrically with regard to the point of rotation of the roller holder and/or a part of the roller holder which allows for controlled pivoting via a pivot element, in particular if a guide roller is disposed on a pivot element, in particular a pivoted lever. In a configuration of this kind the pivot lever is connected with the ability to rotate to the roller holder, and the guide roller is self-centeredly (i.e. without its own eccentricity) connected with the ability to rotate so that via the pivoting ability of the pivot lever an eccentric arrangement is achieved with regard to the point of rotation of the roller holder, which means here with regard to the point of rotation of the pivot lever that is articulated on the roller holder. In most cases, the guiding of the guide roller is configured as self-centered in order to ensure an operation that is as quiet and even as possible.

It is advantageous if the pivoted element can be fixed in place by way of a drive element, for example, and in particular via a bolt that can be inserted in a bore hole in the roller holder.

Moreover, it is also advantageous for this configuration if the pivoted element, in particular the pivoted lever, can be reversibly fixed in placed in preset positions; for example, the pivoted lever may run in a guide groove of the roller holder and stop positions are provided on the guide groove in the form of line-shaped elevations in the material thereby providing for a stopping against such line-shaped elevations in the material but which elevations, however, can be overcome if force is applied thus making a gliding across them possible. Line-shaped elevations in the material can be provided in pairs, arranged closely next to each other so that corresponding elevations in the material of the pivoted lever can arrange itself between this pair position thereby producing reversible fixing action. Furthermore, also conceivable are simple line-shaped elevations in the material either on the sides of the roller holders or on the sides of the pivoted lever and, accordingly, corresponding material recesses are provided for the elevations to engage in whereby a relatively easy reversible fixing action of the pivoted lever is ensured on the roller holder.

Finally, the curved conveyor belt advantageously includes a frame device that predetermines the basic geometry of the curved conveyor belt so that the latter stays constant, irrespective of the settings of the individual conveyor rollers.

Using the drawings below, the invention will now be described by way of examples.

DETAILED DESCRIPTION

Figure 1:
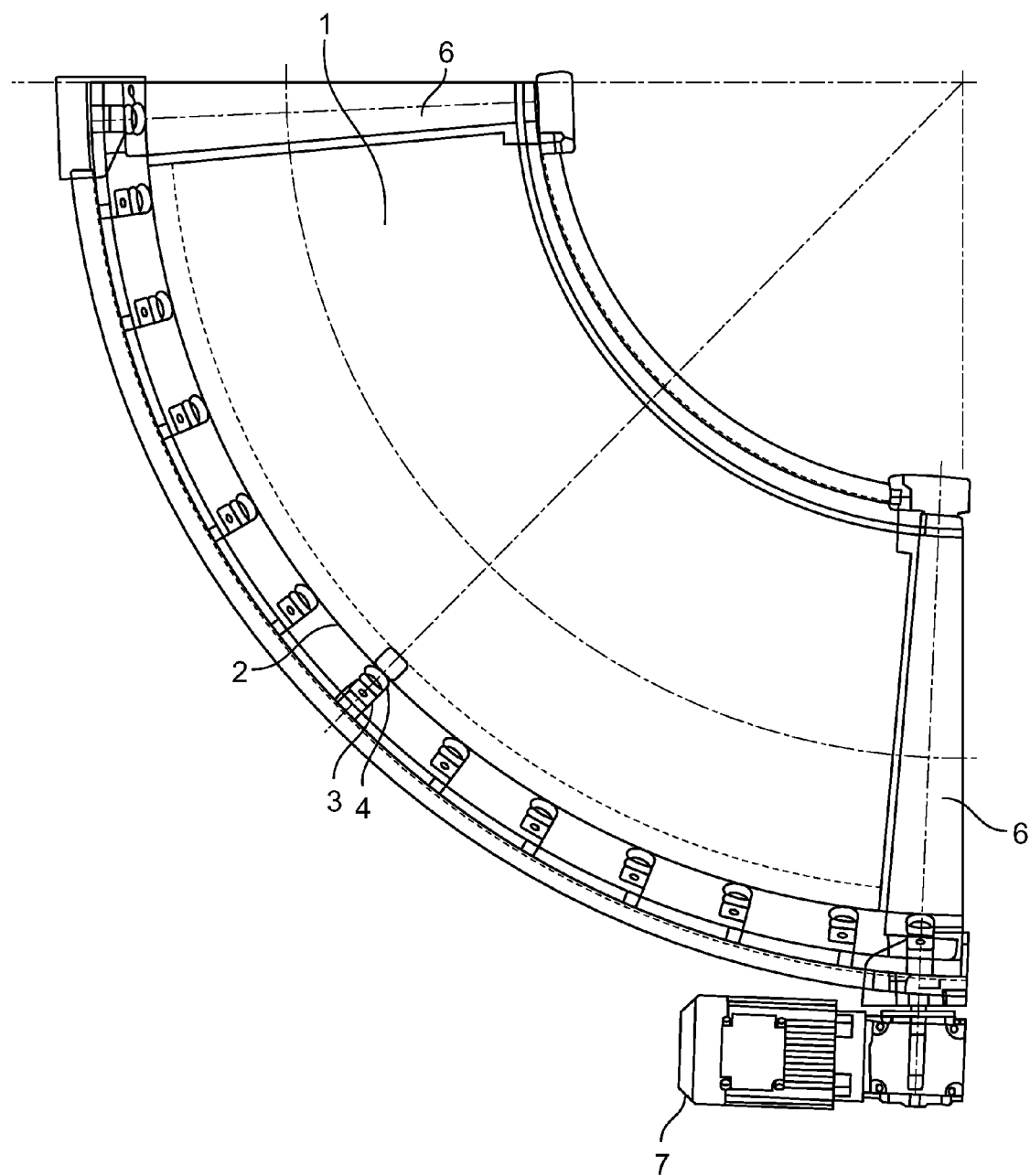
FIG. 1 is a schematic plan view of a cross-section of the curved area of a curved conveyor belt according to the invention.

FIG. 1 shows in a top view a schematic cross-section of a curved conveyor belt according to the invention. A conveyor belt 1, forming quasi a frustum of a cone, is guided over several guide rollers 4, which are rotatably attached on corresponding roller holders 3, and engage in an engagement element in the form of a sewn-on rubber bead arranged on the outside radius of the curve and forming an edge, and whereby the rollers securely guide the conveyor belt thanks to its being endless.

Figure 2:
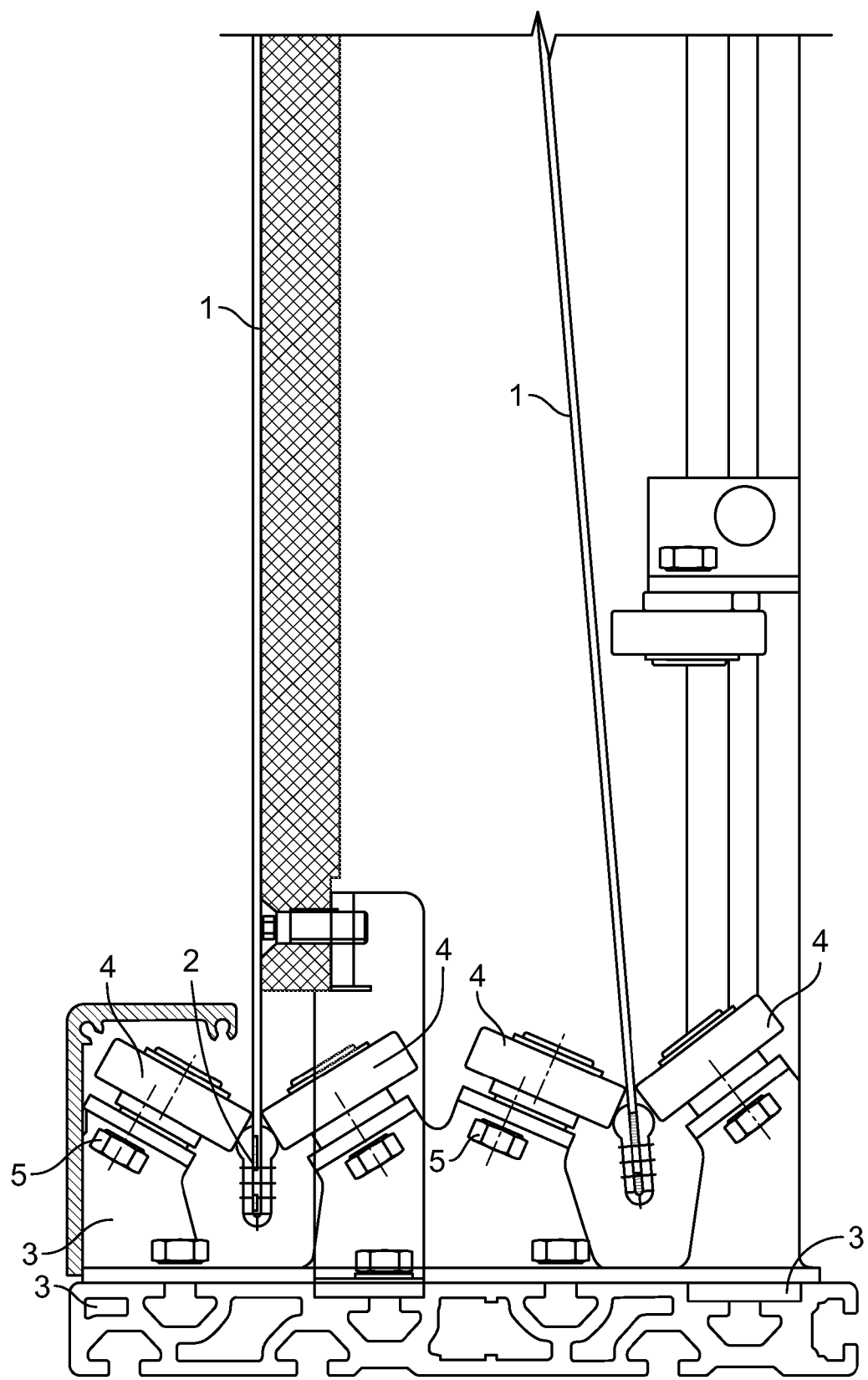
FIG. 2 a schematic side view of a cross-section of a curved section of the curved conveyor belt shown in FIG. 1.
Figure 3:
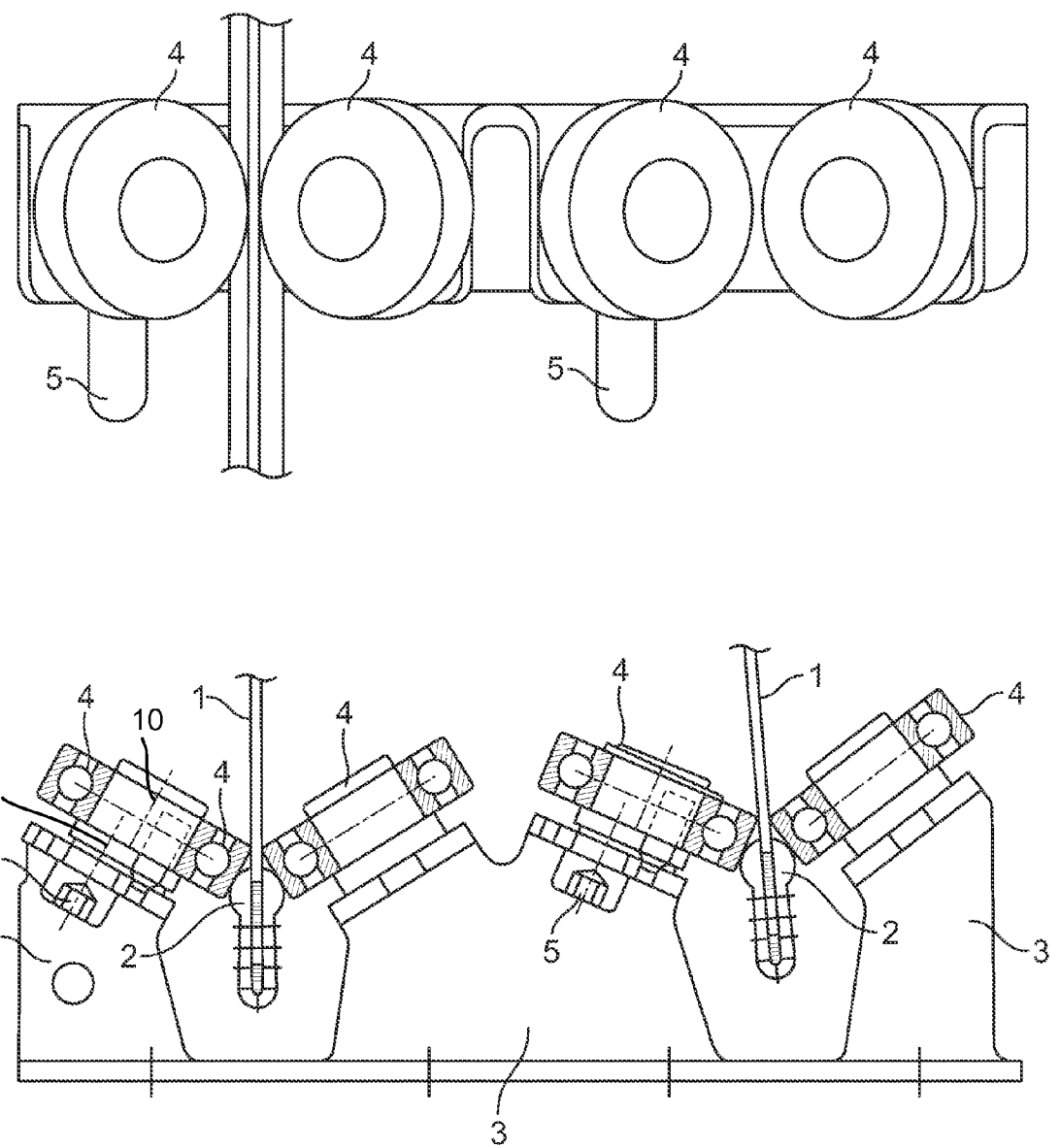
FIG. 3 a detailed partial view of the cross-sectional view shown in FIG. 2.

At least one guide roller 4 of the illustrated example can rotate about a first axis 10 (FIG. 3) relative to holder 3, and the at least one roller 4 can pivot relative to holder 3 about a second axis 15 (FIG. 3) via lever 5. Thanks to the pivoting ability of guide rollers 4 around the pivoted lever 5, as seen in FIG. 3, the conveyor belt 1, that is tensioned and fixed in place via the reverse rollers 6, can be securely guided due to its sensitive adjustability. To effect this, the individual guide rollers 4 as shown in FIG. 2 engage in pairs at the respective locations with a vectorial force component in the direction of the outside edge of conveyor belt lower the bead-type engagement element 2; and at the respective position, both on the tight side as well as on the slack side of the conveyor belt 1, the upper guide roller (e.g., the axis 10) is, via a respective pivoted lever 5, eccentric relative to the point of rotation (e.g., the axis 15) of the pivot lever 5 on roller holder 3 and is therefore pivotable (upward and downward).

According to the invention the roller holder 3 is configured as one piece and is available as a special molded part so that it is fixed in place in the frame device of the curved conveyor belt.

Figure 4:
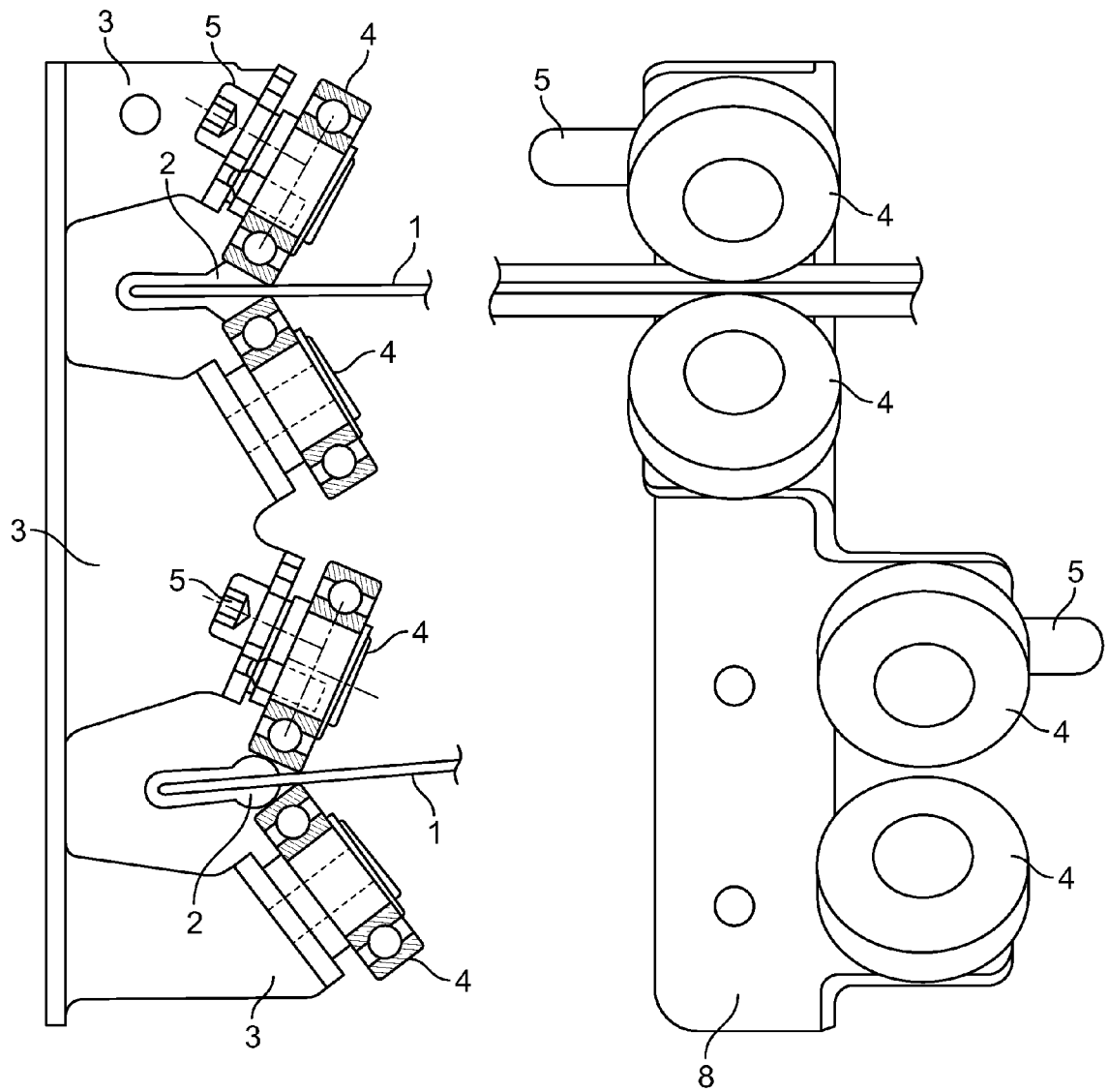
FIG. 4 a detailed partial view of an alternative embodiment with regard to FIG. 3.

In the embodiment that is shown in FIG. 4 the pair type guide rollers 4 are arranged as alternating, i.e. they are reciprocal relative to each other, across an additional captive, riveted holding element 8, whereby the resulting accessibility that is provided for service and repair work is especially comfortable.

A drive unit 7, in the form of a motor, drives, via a drive shaft, the reverse rollers and in this special case also one of the two drive rollers 6. Because of the frustum of a cone-type surface of the conveyor belt 1, the slack side of conveyor belt 1 extends, as seen in cross-section—as may be recognized in FIG. 2—in the direction of the outside edge of the curve slightly diagonally downward, so that the belt sides are guided under tension in order to prevent bulging of material.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A belt conveyor frame assembly, comprising:
a first holder and a second holder opposite the first holder,
a first roller coupled to the first holder;

a first pivot element pivotally coupled relative to the second holder to pivot about a first axis; and a second roller rotationally mounted relative to the first pivot element to rotate about a second axis, the first axis being parallel to, and spaced apart from, the second axis, the first pivot element is to enable the second roller to pivot away from the first roller when the first pivot element is rotated in a first direction about the first axis and to enable the second roller to pivot toward the first roller when the first pivot element is rotated in a second direction about the first axis.

2. A belt conveyor frame assembly as defined in claim 1, further comprising a third holder and a fourth holder opposite the third holder, and a third roller coupled to the third holder.

3. A belt conveyor frame assembly as defined in claim 2, further comprising a second pivot element pivotally coupled relative to the fourth holder to pivot about a third axis.

4. A belt conveyor frame assembly as defined in claim 3, further comprising a fourth roller rotationally mounted relative to the second pivot element to rotate about a fourth axis, the third axis being parallel to, and spaced apart from, the fourth axis, the second pivot element is to enable the fourth roller to pivot away from the third roller when the second pivot element is rotated in a third direction about the third axis and to enable the fourth roller to pivot toward the third roller when the second pivot element is rotated in a fourth direction about the third axis.

5. A belt conveyor frame assembly as defined in claim 3, wherein the first, second, third, and fourth roller holders comprise a one-piece frame.

6. A belt conveyor frame assembly as defined in claim 3, further comprising a conveyor belt having an engagement element to be guided by the first and second rollers and the third and fourth rollers.

7. A belt conveyor frame assembly as defined in claim 6, wherein the engagement element comprises a bead end, the first and second rollers are spaced apart to receive the bead end of the belt therebetween.

8. A belt conveyor frame assembly as defined in claim 6, wherein the third and fourth rollers are spaced apart to receive the bead end of the curved belt therebetween.

9. A belt conveyor frame assembly as defined in claim 3, wherein the first, second, third, or fourth rollers include ball bearings.

10. A belt conveyor frame assembly as defined in claim 3, wherein the first and second rollers form an upper pair of rollers and the third and forth rollers form a lower pair of rollers, wherein the first pair of rollers are alternately arranged relative to the second pair of rollers.

11. A belt conveyor frame assembly as defined in claim 1, wherein the first pivot element comprises a lever.

12. A belt conveyor frame assembly as defined in claim 1, wherein the first pivot element is pivotably fixed in an intermediate position between a first position at which the second roller is away from the first roller and a second position at which the second roller is adjacent the first roller.

* * * * *